United States Patent [19]

Stouffer et al.

[11] Patent Number: 4,644,854
[45] Date of Patent: Feb. 24, 1987

[54] AIR SWEEP DEFROSTER

[75] Inventors: Ronald D. Stouffer, Silver Spring; Otho Boone, Columbia, both of Md.

[73] Assignee: Bowles Fluidics Corporation, Columbia, Md.

[21] Appl. No.: 716,737

[22] Filed: Mar. 27, 1985

[51] Int. Cl.$^4$ ................................................. B60S 1/54
[52] U.S. Cl. ................................. 98/2.09; 98/40.18
[58] Field of Search ................. 98/2, 2.05, 2.08, 2.09, 98/40.18; 137/835, 831

[56] References Cited

U.S. PATENT DOCUMENTS

| | | | |
|---|---|---|---|
| 3,402,727 | 9/1968 | Boothe | 137/835 X |
| 3,745,906 | 7/1973 | Kakei et al. | 98/2.09 |
| 3,832,939 | 9/1974 | Kakei et al. | 98/2.04 |
| 3,926,373 | 12/1975 | Viets | 137/835 X |
| 4,407,186 | 10/1983 | Izumi et al. | 98/2 |
| 4,517,881 | 5/1985 | Stouffer | 98/2.05 |

FOREIGN PATENT DOCUMENTS

| | | | |
|---|---|---|---|
| 2819656 | 11/1978 | Fed. Rep. of Germany | 98/40.18 |
| 108323 | 8/1979 | Japan | 98/40.18 |
| 85/00783 | 2/1985 | PCT Int'l Appl. | 98/2.09 |

OTHER PUBLICATIONS

Van Nostrand's Scientific Encyclopedia, Fifth Edition, Van Nostrand Reinhold Company, copyright 1976, pp. 1076–1079.

*Primary Examiner*—Harold Joyce
*Attorney, Agent, or Firm*—Jim Zegeer

[57] ABSTRACT

A defrost/defog air supply system for issuing a sweeping jet of air upon a windshield or other surface to be defrosted or defogged comprises a fluidic oscillator having a power nozzle coupled to receive the defrost-/defog air and an outlet for issuing a sweeping stream of defrost/defog air onto the surface. The fluidic oscillator is short in length (in the preferred embodiment the distance from the power nozzle to the end of the outlet is less than twice the width of the power nozzle) and has a pair of control ports immediately adjacent the downstream side of the power nozzle of the fluidic and a continuous inertance loop interconnecting the control ports with the continuous inertance loop being of a length and cross-section such as to maintain the frequency of oscillation below about 12 Hz to thereby avoid mixing with ambient air prior to impingement upon the surface to be defrost. The downstream edges of the control ports are set back to permit ambient air to enter the control port when the defrost-defog air issuing from the nozzle is at the opposite sides. Flow straighteners are provided upstream of the power nozzle and just as the air exits from the manifold or supply to assure uniform and symmetrical flow velocity profile in the power nozzle. Sweep angle enhancers are provided at the outlet so that very short diverging sidewalls reduce the amount of underdash space required.

30 Claims, 9 Drawing Figures

FIG.4
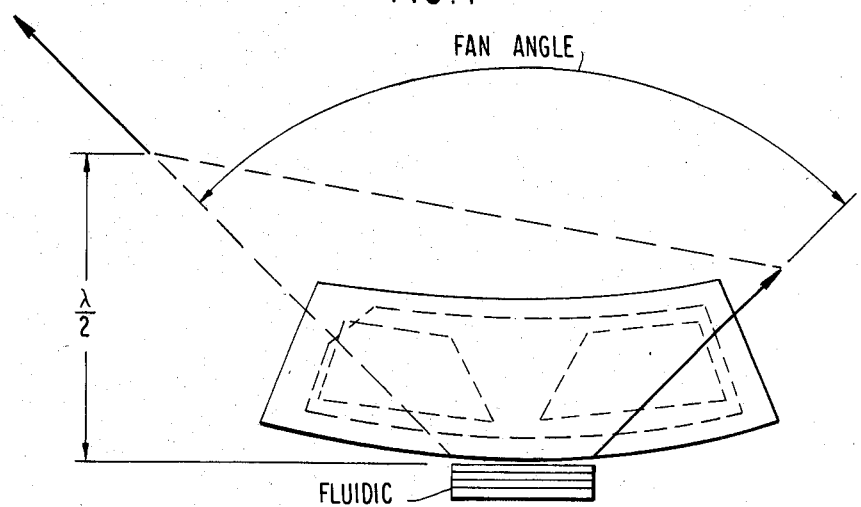
FIG.5
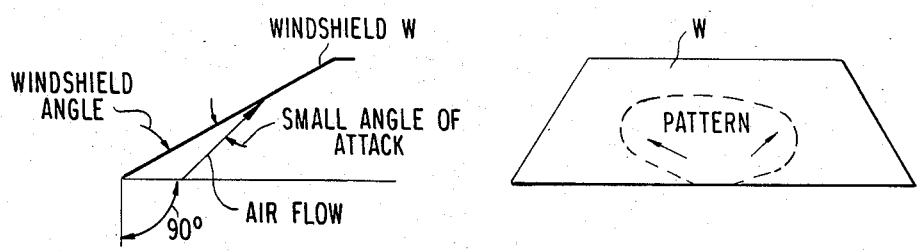
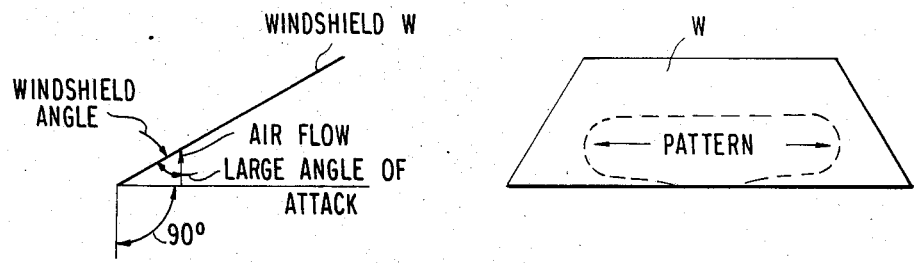
FIG.6

AIR SWEEP DEFROSTER

BACKGROUND OF THE INVENTION

The use of sweeping jet fluidic oscillators for defrosting/defogging operation of automobile windshields is disclosed in Kakei et al. U.S. Pat. Nos. 3,832,939 and 3,745,906, and Stouffer U.S. Pat. No. 4,250,799 (and divisions thereof). In Kakei et al., several forms of sweeping jet oscillators for defrost purposes are disclosed, one of which included a fluidic oscillator in which a pair of crossed feedback pipes received portions of air issuing from the outlet downstream of the throat and returned same to a pair of control ports. In the Stouffer patent, a vibrating reed oscillator is utilized which significantly reduced the amount of space under the dash but the movement of the weighted end of the vibrated reed through the jet or air stream created a swishing sound noticable to passengers in the close confined space of an automobile. The use of electromagnets to control the valving of the control ports for switching purposes has been suggested for use in cars but this invites an unnecessary complexity and requires a fluid logic element of at least 5W in length to get adequate sweeping angles where W is the width of the power nozzle. Fluidic oscillators based on an continuous passage or loop interconnecting the pair of control ports of the fluidic element are known in the art as disclosed in Van Nostrand's Scientific Encyclopedia (6th Edition) page 1235, for example. Izumi et al. U.S. Pat. Nos. 4,416,192, 4,407,186 and 4,393,898 disclose use of fluidics with electromagnetic control in directional control of air in automobiles.

DESCRIPTION OF THE PRESENT INVENTION

The basic fluidic oscillator of the present invention has several features which make it ideal as a defroster outlet for motor vehicles. The oscillator portion itself can be made relatively short, under, for example, about 2W where W is the width of the power nozzle, so that, with the use of sweep angle enhancers as disclosed herein, the fluidic sweep angle can be designed to cover angles up to about 180 degrees with about 120 degrees being typical. This gives the fluidic nozzle the flexibility to defrost any windshield configuration from a single outlet source located near the center line of the windshield. However, it is within the contemplation of this invention that instead of a single oscillator, one fluidic oscillator can be utilized for the passenger side as well as one for the driver side. The sweep angle referred to above is measured from the center line of the emerging air jet at each extreme position of sweep in the oscillator. The actual extent of the oscillation is slightly larger than the fan angle and is measured from the extremes of the jet profile. The frequency of oscillation can be controlled to provide excellent distribution over the windshield and minimum mixing with ambient air. This is achieved by designing the fluidic oscillator's wavelength to be greater than the distance from the fluidic outlet to the upper corners of the windshield all as described in Stouffer U.S. Pat. No. 4,250,799 (and division thereof). Under this condition, air exiting from the fluidic oscillator during each cycle has ample time to cover the windshield with a coherent jet. The wavelength of the fluidic is constant for any supply pressure (i.e., the blower setting), thus yielding consistent distribution and minimum ambient mixing in all defrost modes. The fluidic sweep angle and the frequency, which in the preferred embodiment is below 12 Hz, and the angle of attack relative to the windshield more efficiently clear the passenger and driver side as called for in the Federal Motor Vehicle Standard Specifications (FMVSS103). However, the invention also provides great flexibility in the design to change the defroster clearing patterns and in this respect, one factor governing defrost pattern development is the aiming angle or angle of attack relative to the windshield. Controlling the angle of attack is achieved by element positioning (taking into account the space available under the dash) and/or the outlet control vane adjustment. For any sweep angle, low angles of attack (flow more parallel to the windshield), the defrost pattern growth is faster from base to the top of the windshield. For large angles of attack (flow more perpendicular to the windshield), the pattern growth is faster from the windshield center line to the sides.

While in the preferred embodiment, the sweep angle enhancing vanes are shown as having parallel axes, it is contemplated that there may be instances where the curvature of the windshield is such that the sweep angle enhancing vanes be set at angles to better accomodate such curvature and direct the blast of air at an angle of attack commensurate with the windshield curvature or, when two nozzles are used to direct some defrost air to side windows at the ends of the sweep.

Significantly, the oscillator utilized in the present invention mates with existing blower systems without reducing the blower output so that the fluidic oscillator itself can be sized to deliver the same volumetric flow rate as in the current defrost system using wide diffuser vane and diverging funnel. Thus, the fluidic oscillator utilized on a defroster outlet offers essentially the same impedance to the blower system as a conventional diffuser vane diverging funnel arrangement. While the two systems offer similar impedance, the controlling restriction for the fluidic oscillator according to the present invention in a typical example is about 3.75 square inches as compared to about 14.6 square inches for conventional production type systems.

According to this invention, underdash volumetric space occupied by the defrost system is reduced by the fluidic oscillator is made relatively short and is of the type having a power nozzle, a pair of control ports immediately adjacent to and downstream of the power nozzle and a continuous inertance loop interconnecting the control ports. In the preferred embodiment, a pair of relatively short sidewalls are provided along with one or more sweep angle enhancers. While the diverging sidewalls can obviously be made longer, in the preferred embodiment the downstream edges of the diverging walls are made less than twice the width of the power nozzle (2W). In addition, since the air flow from the blower to the fluidic oscillator itself is controlled by the channeling and duct work in the vehicle, flow straighteners are preferrably utilized just at the manifolding of the oscillator to the duct work to thereby reduce the length of ducting to the power nozzle and thereby assure more uniform and symetrical velocity of profile of the air stream entering the power nozzle. Fluid inertance is a measure of the pressure required to accelerate a mass of fluid in a passageway and thus is associated with flow through a tube or passage and is a function of the length and cross-sectional area thereof. Since the fluidic oscillator utilized is more sensitive to the inertance loop's cross-sectional area than to its length, that is, the fluidic is sensitive to abrupt changes in cross-section or particularly sudden reductions cross-sectional area of the continuous inertance loop, an important feature of the invention is the avoidance of abrupt changes in cross-section in direction or cross-sectional area of fluid flow in the continuous inertance loop. The inertance loop is coupled to the control ports via entry ways.

With appropriate inertance loop cross-sectional area, the fluidic oscillates over a large range of lengths and feed pressures. With the oscillator exemplary dimensions given herein, for lengths of ¾ inch (approximately internal diameter tubing which have equivalent square or rectangular cross-sections), for passageway or loop lengths about 15–18 inches a ¾ inch internal diameter inertance tube gives consistantly low standard deviation although other inertance tube cross-sections operated well within the scope of this invention. According to this invention, the length and cross-sectional area of the inertance loop tube is chosen so as to assure that the frequency of oscillation is below about 12 Hz so that the inertance loop will be large. The invention provides a solution to the problem of packaging large inertance loops. In addition, the inertance loop itself is shaped or "packaged" so as to reduce the volmetric space required. Thus, the inertance loop can be a sinuous or serpentine path formed on one of the walls or disposed in part of the duct work leading to the fluidic oscillator or it can be formed or "wrapped" in a helical fashion around the fluidic oscillator itself. In any case, the above noted criteria of no sharp reductions in cross-sectional area or sharp turns are avoided so as to not effect the inertance quality, is required.

The worst type of flow with respect to good oscillation is one where, just upstream of the power nozzle of the fluidic oscillator there is a large velocity gradient from one side of the feed channel to the other. In a preferred embodiment several flow straighteners in the upstream portion of the feed are used to assure a symmetrical and more uniform velocity profile and prevent air from piling up on one side of the flow of air to the power nozzle. If underdash space was not a factor then a straight feed tube or duct (about 6W long where "W" is the width of the power nozzle) can be used in place of or in addition to flow straightners.

Thus, flow variations and problems with flow are solved preferably using flow straighteners and not inertanence or control port manipulation. In one operating embodiment as disclosed herein, the height of the unit e.g., from floor to ceiling as opposed to width is about one and one half inches when the width of the power nozzle is about 2.5 inches.

The fluidic units are not as sensitive to flow problems from floor to ceiling. If the flow is "stacked" on the ceiling, placing the inertance inlet near the ceiling solved the problem. The inertance loop can be round or square in configuration and for form factor purposes this may be preferred.

It is the object of the present invention to provide an improved defrost/defog system for motor vehicles which is compact, has no moving parts, rapidly cleans a surface of frost or fog, is of relatively low cost, which can eliminate one defrost nozzle and reduce the underdash space required for defrost systems.

BRIEF DESCRIPTION OF THE DRAWINGS

The above and other objects, advantages and features of the invention will become more apparent when considered with the following specification and accompanying drawings wherein:

FIG. 4 illustrates diagrammatically the operation of the fluidic in relation to the windshield and the wavelength thereof, FIGS. 5 and 6 are diagrammatic illustrations showing the effect of the angle of attack and the defrost pattern formed on the windshield.

DETAILED DESCRIPTION OF THE INVENTION

Figure 1:
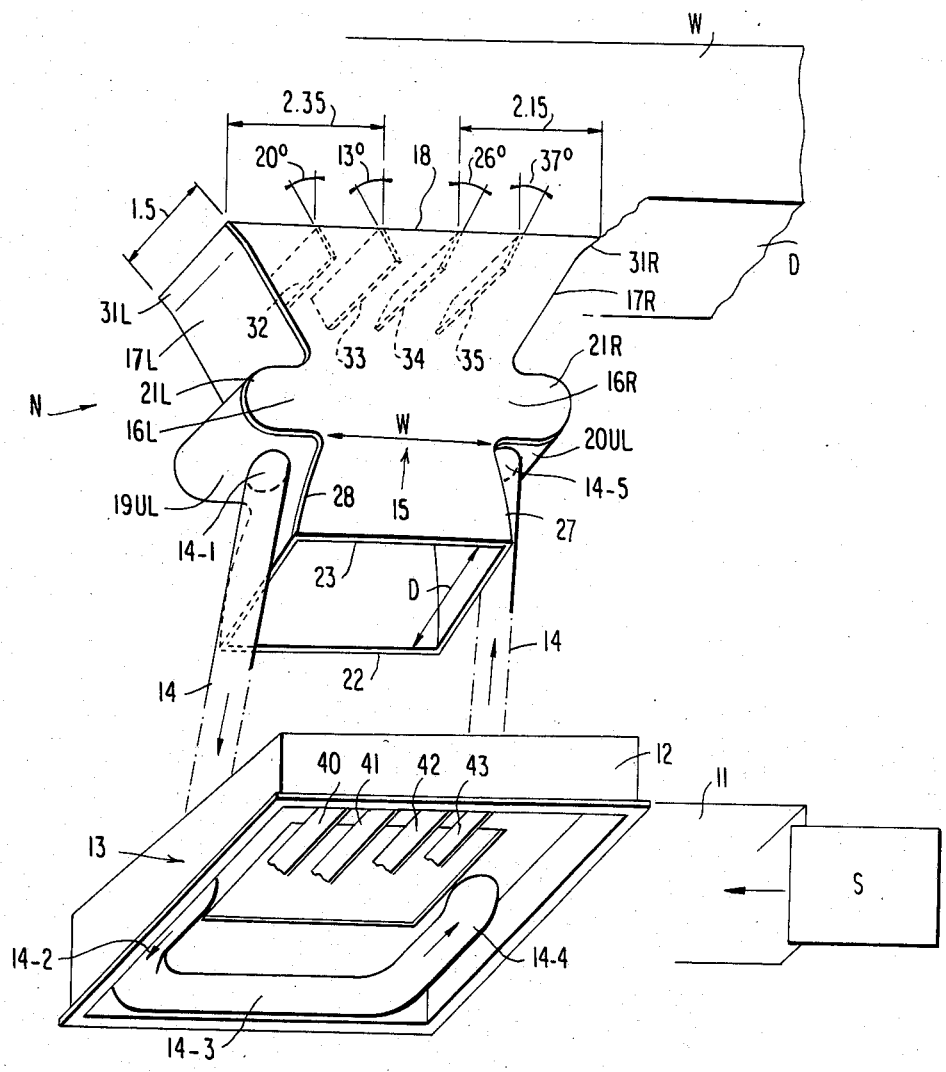
FIG. 1 is an exploded isometric view of a defrost/defog nozzle as installed in a dashboard to defrost/defog a windshield of a vehicle and incorporating the invention.

Referring now to FIG. 1, the fluidic oscillator nozzle N is shown installed in a dash D of an automobile or other vehicle for projecting defrost/defog air in a sweeping pattern upon the windshield W of the automobile. Nozzle N is comprised of a fluidic oscillator 10 which receives defrost/defog air under pressure from a supply (not shown) coupled via passage or duct 11. A coupling member 12 is constituted by a generally rectangular frame 13 which, as will be described more fully hereafter, may be used to house or "package" a portion of inertance loop 14 and thus improve the form factor and reduce underdash volumetric space required by the unit. Fluidic oscillator 10 comprises a power nozzle 15 having a width W, a pair of rectangular control ports 16L, 16R and a pair of short diverging wall elements 17L, 17R and in the preferred embodiment, the length of short wall elements 17L and 17R is such that the distance from the power nozzle to the outer edge 18 of the oscillator is less than 2W. Control ports 16L and 16R are connected by a continuous inertance loop 14 which, in this embodiment enters or is coupled to the upstream side 19UL and 20UL of cylindrical structures 21L and 21R forming the control port structures 16L and 16R. In this embodiment the conttrol ports 16L and 16R per se are rectangular in cross-section. The upper and lower cover plates 22 and 23, respectively are parallel to one another and spaced apart a distance D. The power nozzle aspect ratio is defined as the power nozzle width divided by the power nozzle depth (W/D). When several aspect ratios are plotted with respect to feed pressure and frequency, it was found that the higher the aspect ratio (short, wide jet), the higher the frequency. With respect to their respective frequencies at constant pressure, it was found that doubling the aspect ratio approximately doubled the frequency at constant inertance. The general relation between frequency and power nozzle area at constant inertance is the smaller the area the higher the frequency.

The distance from the power nozzle throat 25 upstream to the coupling unit 12 is made as short as possible when the flow straighteners described later herein are used. It should be noted that while the power nozzle is comprised of a pair of converging sidewalls 27 and 28 straight sidewalls could be used. The downstream edges of the control structures 21L and 21R are set back a short distance for reasons to be described more fully hereafter. The angular relationship of the sidewalls 17L and 17R can be varied. In the following, wall exit angles are measured relative to the set back point. A wall angle of 0 degrees is parallel to the flow and an angle of 90 degrees is perpendicular to the flow. In tests, the length of the wall elements 17L and 17R were varied from about ½ inches to 3 inches. The minimum wall angle for oscillation is about 5 degrees for both wall length and between 5 degrees and 20 degrees, the shorter wall had a higher frequency.

Figure 2:
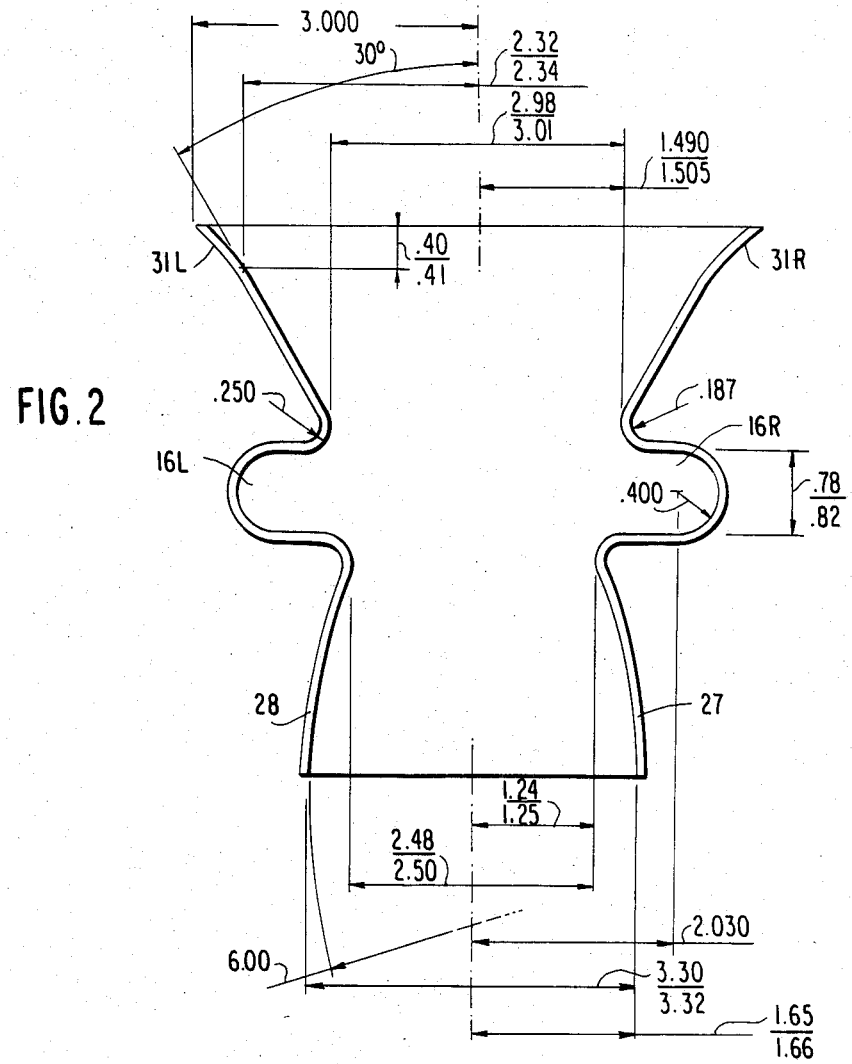
FIG. 2 is a plan view of the silhouette of the fluidic oscillator with exemplary dimensions thereon.
Figure 3:
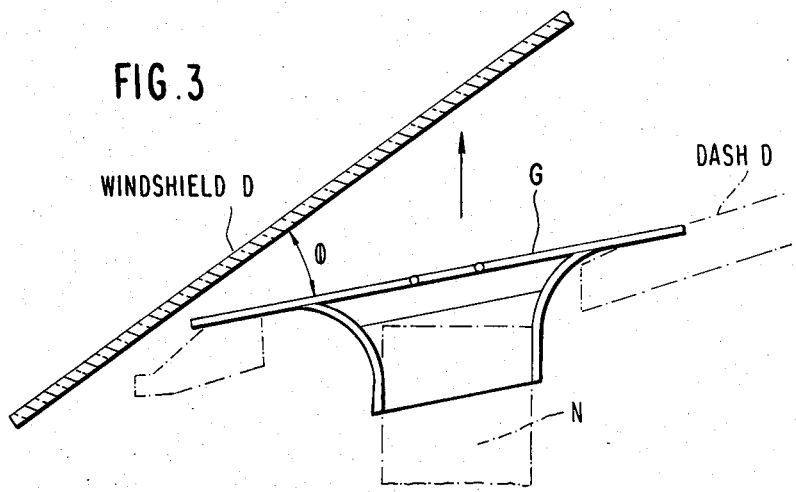
FIG. 3 is a side sectional view showing one angular relationship of the nozzle to the windshield.
Figure 7:
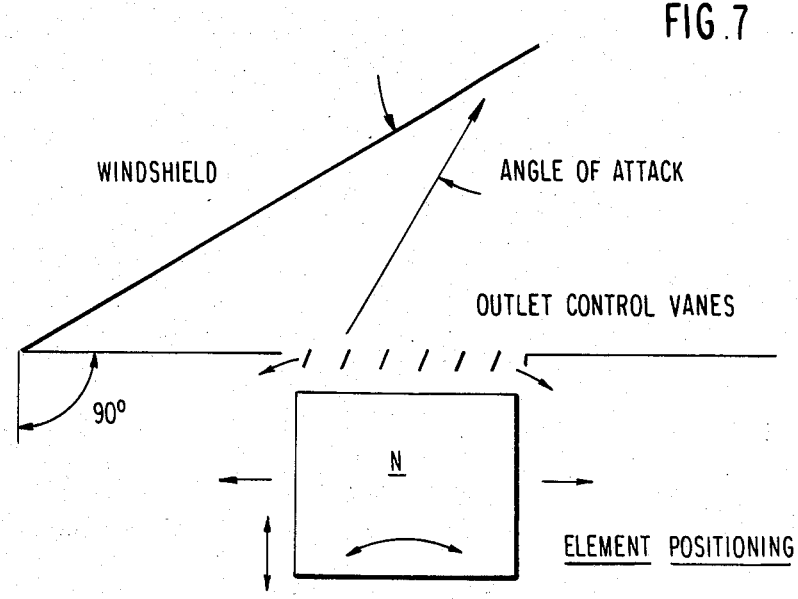
FIG. 7 is a diagrammatic illustration showing the adjustment of the oscillator relative to adjust the angle of attack relative to a windshield.

As shown in FIGS. 1 and 2, the outer most ends of the short wall elements are provided with convexly curved segments 31L and 31R which in conjunction with sweep angle enhancers 32, 33, 34 and 35, cause a greatly enhanced sweep angle. That is, a larger sweep angle for a given fluidic oscillator. In other words, the sweep angle is enlarged or made much larger than would normally be the case without the sweep angle enhancers. While the number and angulation of the sweep angle enhancers can be uniform that is, one or more on each side, and each of the same length and angularity, it will be appreciated as shown in FIGS. 1 and 2 that the angles of the sweep angle enhancers 32–35 can be adjusted to accomodate the position and angularity of the windshield and other dashboard topographical features. In fact, one sweep angle enhancer can be incorporated into a nozzle outlet so that the sweep will be greater on one side, for example the left side towards the left side or driver's side as opposed to the right side if this be desired. In addition, the sweep angle enhancers can be adjusted in length in the direction of flow to provide more or less of sweep angle enhancement effects. In some cases, where two oscillating nozzles are used, it may be desirable to have the nozzle on the passenger side direct more defrost air toward the left driver's side to assure that the driver side clears faster and is maintained clear for safety reasons.

A feature of the invention is the form factor of the inertance loop so as to reduce the volumetric space occupied by the oscillator. In the embodiment shown in FIG. 1, inertance loop 14 is coupled at one end 14-1 into the upstream side 19UL of the cylindrical structure 21L forming the coupling to left control port 16L and extends rearwardly or upstream wise into the rectangular box like structure 13 forming the coupling or fitting 12 to the plenum 11. The inertance loop 14 forms a first loop portion 14-2 extending in a left rearward direction in FIG. 1 and then a second loop portion 14L-3 extending transversely of the flow path and then a third loop portion 14L-4 which extends upwardly and then extends outside box 12, towards the upstream side 20UL of the cylindrical structure 21R where end 14-5 couples inertance loop flow to the right control port 16R. Ends 14-1 and 14-5 of the inertance loop can be impedance matching horn elements to enhance the effect of flow in the inertance loop on the air stream issuing through the power nozzle and enhance the switching effect. This can, for example, be curved in the form of a ram's horn thereby avoiding sharp turns and gradually increasing in cross-section to approach matching the cross-section of the control ports 16L and 16R.

Figure 8:
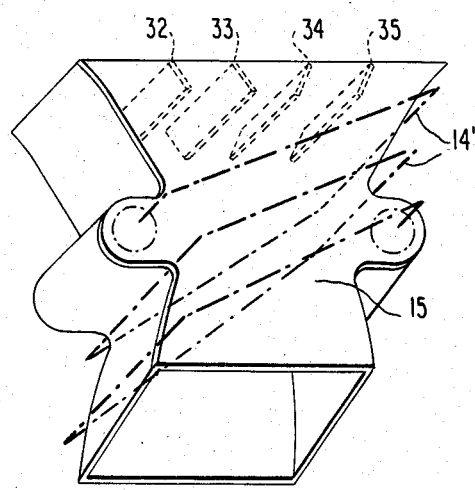
FIG. 8 is a diagrammatic illustration of the fluidic oscillator with a helical wind or wrap of the continuous inertance loop.
Figure 9:
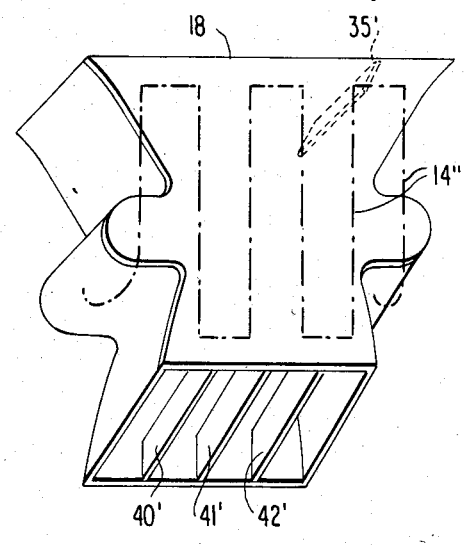
FIG. 9 is a diagrammatic illustration of a fluidic oscillator with a sinuous or serepentine path for the continuous inertance loop and flow straighteners therein.

Flow straighteners 40, 41, 42 and 43 are provided in the preferred embodiment so as to avoid problems caused by effects of turbulence and non-uniformity in the velocity profile in the flow of the air jet from the supply to the power nozzle 15 and prevents air from piling up on one side of the unit. It will be appreciated that if form is not significant and more volumetric space is provided under the dash for this defrost system, there is no need to design the inertance loop for any consideration other than the criteria mentioned above namely, uniform cross-sectional area and no sharp corners or bends that would effect the inertance property thereof. As shown in FIG. 8, the inertance loop 14' has one end 14'-1 coupled to a port 16P at the upper end of the cylindrical structure 21L and is wound in helical fashion about the oscillator and ends up in a second port 16PR in the end of the cylindrical structure 21R. It will be appreciated that the inertance loop 14' can be formed with passages molded or otherwise formed as an integral part of the external surfaces of the oscillator to thus improve the form factor. As indicated in FIG. 9, the inertance loop is in the form of a serepentine or sinuous path molded or otherwise formed on one of the top and bottom walls 22 and 23 of the fluidic oscillator 10. However, it will be appreciated that the loop 14S can be formed half on one surface 22 and the other half on surface 23, due regard being had for the effect of surface friction on the flow properties of the smaller sectioned loops. A plurality of parallel paths which satisfy the basic inertance requirements for this oscillator can be utilized to improve the form factor in some situations.

As shown in FIG. 2, in the defroster disclosed herein, the control port width is about 0.8 and the set back width is about 2.260 inches. The unit is sensitive to moving the set back. The unit is less sensitive to widening the set backs. In general, if you open the set back you must open the control ports and vice versa.

The forces needed to induce oscillation arises from the differential pressure across the control ports 16L and 16R which, in this embodiment, are rectangular openings. The pressure in the control port varies from atmospheric to some negative pressure. During oscillation this pressure oscillates about a negative biased level. The maximum pressure differential occurs when the jet attaches to one of the outlet walls 31L or 31R and dwells there for a (relatively short) period of time. (In installations where a single defrost nozzle is centrally located, the dwell at the ends provides heavy ended sweep which better defrosts the driver and passenger sides. This heavy endedness, wherein a larger volume of defrost air flows than during the regular sweeping motion can be designed to catch side windows when one defrost nozzle is used, When the control port pressure is plotted against the feed pressure it was found that a straight line curve resulted. Both control ports are at a pressure which is less than atmospheric however the control port nearest the jet is always at a lower pressure. Tests indicate that the control port differential pressure increases in a linear fashion with increasing feed pressure. The magnitude of the pressure differential is not only controlled by the feed pressure (or velocity) but also by the control port width, set back width, distance from power nozzle to set backs. The interrelationship of these parameters is not fully understood at this time so these relationships hold for constant fluidic geometry. In the disclosed embodiment, during oscillation, the control port pressure never reaches maximum static pressure. A short inertance at low feed pressure and a long inertance at high feed pressure yielding the same frequency have the same ratio of dynamic/static pressure in the control port. In the embodiment shown in FIG. 2, the range of stable oscillation was seen to be between about 60 percent and 10 percent of the maximum static control port pressure. Larger inertance values have higher control port differentials at the same feed pressure. Having a large differential seem to yield good oscillation until reaching about 60 percent of the static pressure where notable hesitation occurs from, it is believed, wall attachment and excessive flow delays in the inertance.

The power nozzle aspect ratio is defined as the power nozzle width/power nozzle depth. When several aspect ratios are plotted with respect to feed pressure and frequency, it was found that the higher the aspect ratio (short, wide jet), the higher the frequency. At constant pressure, doubling the aspect ratio approximately doubled the frequency at constant inertance. This holds true only if the power nozzle areas are held constant and other fluidic geometry is held constant. The general relationship between frequency and power nozzle area at constant inertance is: the smaller the area, the higher the frequency.

In FIG. 3, the dash D and windshield W are at angles 0 determined by the car manufacturer. In this situation, air sweeping from the fluidic oscillator 10 passes through a grill G which is substantially completely open and is of low impedance so as to not adversely affect operation of the oscillator. The angle of attack can be adjusted by various design paramaters regarding the fluidic oscillator as described above. Thus, the frequency of oscillation can be controlled to provide excellent distribution over the windshield and minimum mixing with the ambient air. As noted above, this is achieved by designing the fluidic oscillator's wavelength to be greater than the distance from the fluidic outlet to the upper corners of the windshield (see FIG. 4). Under this condition, air exiting from the fluidic during each cycle has ample time to cover the windshield with a coherent jet. The wavelenth of the fluidic is a constant (for any supply pressure (i.e., blower setting) thus yielding consistant distribution and minimum ambient mixing in all defrost/defog modes. In this invention, the dominant factor governing defrost pattern development is the aiming angle (or angle of attack) relative to the windshield as is shown in FIG. 7. Control of the angle of attack is achieved by the positioning of the fluidic oscillator (in the volumetric space available therefor as provided by the car manufacturer). In FIG. 7, the fluidic element 10 is shown as being adjustable laterally, towards and away from the windshield and rotated about an arc. However, these are design adjustments and not intended to reflect adjustments of the unit in use.

For any sweep angle, low angles of attack (more flow parallel to the windshield), the defrost pattern growth as shown in FIG. 5 is faster from the base to the top of the windshield. For large angles of attack (flow more perpendicular to the windshield), the pattern of growth is faster from the windshield center line to the sides (see FIG. 6).

While there has been disclosed and described preferred embodiments of the invention, it is to be noted that various changes and modifications will be apparent to those skilled in the art and it is intended that such changes and modifications be encompassed and included within the scope and the spirit off the claims appended hereto.

What is claimed is:

1. In a defrost/defog system for vehicle comprising a source of defrost/defog air under pressure and a fluidic oscillator having a power nozzle coupled to receive defrost/defog air from said source, an outlet for issuing a sweeping stream of defrost/defog air on a window surface of said vehicle, the improvement wherein said fluidic oscillator comprises, means forming a pair of control ports immediately adjacent and in fluid communication with the downstream side of said power nozzle, continuous inertance loop means connecting said control ports together, said continuous inertance loop being of a length and cross-sectional area such as to maintain the frequency of oscillation sufficiently low such that there is minimum mixing of defrost/defog air with ambient air.

2. The defrost/defog system defined in claim 1 wherein, the downstream edges of said control ports are set back to permit ambient air to enter said control port when the defrost/defog air stream issuing from said power nozzle is at the opposite side.

3. The defrost/defog system defined in claim 1 wherein said fluidic oscillator has top and bottom walls, said continuous inertance loop is constituted by a serpentine path bounded on one side at least in part by one of said walls.

4. The defrost/defog system defined in claim 1 wherein said continuous inertance loop has no sharp projections therein.

5. The defrost/defog system defined in claim 1 including one or more sweep angle enhancing means downstream of said control ports for augmenting the normal sweep angle of said fluidic oscillator.

6. The defrost/defog system defined in claim 2 including a short sidewall connected to the downstream edges of said control ports and diverging from each other in a downstream direction, and at least one sweep angle enhancing blade spaced from the downstream end of said short sidewall for augmenting the normal sweeping of said fluidic oscillator.

7. The invention defined in claim 1 wherein said control ports having upstream and downstream edges, said downstream edges being set back further from the center line of said fluidic oscillator so that when the defrost/defog air from said power nozzle is deflected to one side of said center line, ambient air enters the control port on the side opposite said one side.

8. In a defrost/defog system for vehicle comprising a source of defrost/defog air under pressure and a fluidic oscillator having a power nozzle coupled to receive defrost/defog air from said source, an outlet for issuing a sweeping stream of defrost/defog air on a surface, the improvement wherein said fluidic oscillator comprises, means forming a pair of control ports immediately adjacent and in fluid communication with the downstream side of said power nozzle, continuous inertance loop means connecting said control ports together, said continuous inertance loop being of a length and cross-sectional area such as to maintain the frequency of oscillation sufficiently low such that there is minimum mixing of defrost/defog air with ambient air, and flow straighteners means in the stream of defrost/defog air upstream of said power nozzle so that air flow to said power nozzle has a substantially symmetrical velocity profile upon approaching and entering said power nozzle.

9. The defrost/defog system defined in claim 8 wherein said power nozzle has converging sidewalls.

10. The invention defined in claim 8 wherein said flow straighteners comprise a plurality of flat vanes aligned parallel to each other and the axis of flow through said power nozzle.

11. The invention defined in claim 8 including a pair of sidewalls connected to the downstream edges of said control ports and diverging from each other in a downstream direction, and
   at least one sweep angle enhancing blade means spaced from the downstream end of said sidewalls for augmenting the angle of sweep of said sweeping stream of air as it approaches said sidewalls and said at least one sweep angle enhancing blade.

12. The invention defined in claim 11 wherein there are a plurality of sweep angle enhancing blades.

13. The invention defined in claim 12 wherein each of said blades is positioned at a different angle relative to the axis of said power nozzle.

14. The defrost/defog system as defined in claim 12 wherein said outlet is centrally located relative to said window surface and constitutes a sole source of defrost/defog air for clearing said windshield of frost and fog.

15. The defrost/defog system as defined in claim 12 wherein said window is the windshield of a motor vehicle and including means for causing the sweep to be greater on a driver's side as compared to a passenger's side.

16. In a windshield defrost/defog system having a source of defrost/defog air under pressure and a fluidic oscillator for receiving said defrost/defog air and having an outlet for issuing a sweeping jet of air toward said windshield, the improvement wherein said fluidic oscillator consists of a power nozzle coupled to receive said defrost/defog air,
   a pair of control ports adjacent to and in fluid communication with said power nozzle, and
   an inertance forming passage connected between said control ports, said inertance forming passage having a length and cross-section to case oscillation at a predetermined frequency, the distance from said power nozzle to said outlet being substantially less than 2W, and a pair of diverging wall members connecting said outlet to said control ports.

17. The invention defined in claim 16 including at least one sweep angle enhancing blade spaced inwardly from one wall of said pair of diverging wall members for augmenting the angle of sweep of said sweeping jet of air as said jet approaches said one wall.

18. The invention defined in claim 16 wherein said diverging wall members are straight, and further including a relatively short convexly curved sections at the terminal end of said outlet.

19. The defrost/defog system defined in claim 17 wherein said outlet is centrally located relative to said window surface and constitutes a sole source of defrost/defog air for clearing said windshield of frost and fog.

20. In a windshield defrost/defog system having a source of defrost/defog air under pressure and a fluidic oscillator for receiving said defrost/defog air and having an outlet for issuing a sweeping jet of air toward said windshield, the improvement wherein said fluidic oscillator consists of a power nozzle coupled to receive said defrost/defog air,
   a pair of control ports adjacent to and in fluid communication with said power nozzle, and
   an inertance forming passage connected between said control ports, said inertance forming passage having a length and cross-section to cause oscillation at a predetermined frequency, the distance from said power nozzle to said outlet being substantially less than 2W, and a pair of diverging wall members connecting said outlet to said control ports, and flow straightener means in the stream of defrost/defog air upstream of said power nozzle so that air flow to said power nozzle has a substantially symmetrical flow velocity profile upon entering said power nozzle.

21. In a defrost/defog system comprising a source of defrost/defog air under pressure and a fluidic oscillator having a power nozzle coupled to receiving defrost/defog air from said source, an outlet for issuing a sweeping stream of defrost/defog air on a surface, said outlet having parallel top and bottom walls and diverging sidewalls, the improvement wherein said fluidic oscillator comprises,
   a pair of control ports in fluid communication with said power nozzle and immediately adjacent to the downstream side of said power nozzle,
   continuous inertance loop means connecting said control ports together,
   said continuous inertance loop being of a length and cross-sectional area such as to maintain the frequency of oscillation sufficiently low such that there is a minimum mixing of defrost/defog air with ambient air, and
   sweep angle enhancing vanes spaced inwardly from the downstream ends of said diverging sidewalls.

22. The defrost/defog system defined in claim 21 wherein,
   the downstream edges of said control ports are set back and connected to the upstream ends of said diverging sidewalls, respectively.

23. The defrost/defog system defined in claim 21 wherein the distance from said power nozzle to said downstream ends of said diverging sidewalls is less than twice the width of said power nozzle.

24. The defrost/defog system defined in claim 21 wherein said window is the windshield of a motor vehicle and said outlet is centrally located relative to said windshield and constitutes the sole source of defrost/defog air for clearing said windshield of frost and fog.

25. The defrost/defog system defined in claim 24 including means for causing the sweep of said sweeping stream of defrost/defog air to be greater on a driver's side of said motor vehicle as compared to a passenger's side thereof.

26. In a defrost/defog system comprising a source of defrost/defog air under pressure and a fluidic oscillator having a power nozzle coupled to receive defrost/defog air from said source, an outlet for issuing a sweeping stream of defrost/defog air on a surface, said outlet having parallel top and bottom walls and diverging sidewalls, the improvement wherein said fluidic oscillator comprises,
   a pair of control ports in fluid communication with said power nozzle and immediately adjacent to the downstream side of said power nozzle,
   continuous inertance loop means connecting said control ports together, said continuous inertance loop being of a length and cross-sectional area such as to maintain the frequency of oscillation sufficiently low such that there is a minimum mixing of defrost/defog air with ambient air, sweep angle enhancing vanes spaced inwardly from the dowmstream ends of said diverging sidewalls, the distance from said power nozzle to said downstream ends of said diverging sidewalls is less than twice the width of said power nozzle, and further including flow straightener means upstream of said power nozzle to assure that the flow velocity gradient of air is substantially symmetrical and uniform across said power nozzle to thereby shorten the overall length of said fluidic oscillator.

27. In a defrost/defog system comprising a source of defrost/defog air under pressure and a fluidic oscillator having a power nozzle coupled to receive defrost/defog air from said source, an outlet for issuing a sweeping stream of defrost/defog air on a surface, said outlet having top and bottom walls and diverging sidewalls, the improvement wherein said fluidic oscillator comprises, a pair of control ports in fluid communication with said power nozzle and positioned immediately adjacent the downstream side of said power nozzle, with said sidewalls being connected to the downstream edges of said control ports, respectively, continuous inertance loop means connecting said control ports together, said continuous inertance loop means being of a length and cross-section such as to maintain the frequency of oscillation sufficiently low such that there is minimum mixing of defrost/defog air with ambient air, and flow straightener means upstream of said power nozzle to assure that the flow velocity gradient of air to said power nozzle is substantially symmetrical and uniform.

28. The defrost/defog system defined in claim 27 wherein, the downstream edges of said control ports are set back to permit ambient air to enter said control port when the defrost/defog air stream issuing from said power nozzle is at the opposite side and the distance from said power nozzle to the downstream edges of said sidewalls is less than twice the width of said power nozzle.

29. In a defrost/defog system for vehicle comprising a source of defrost/defog air under pressure and a fluidic oscillator having a power nozzle coupled to receive defrost/defog air from said source, an outlet for issuing a sweeping stream of defrost/defog air on a surface, the improvement wherein said fluidic oscillator comprises, means forming a pair of control ports immediately adjacent and in fluid communication with the downstream side of said nozzle, the downstream edges of said control ports being set back to permit ambient air to enter said control port when the defrost/defog air stream issuing from said power nozzle is at the opposite side, a pair of short sidewalls diverging in the direction of said outlet and connected at their upstream ends to the downstream edges of said control ports, said power nozzle having a width W, the distance from said power nozzle to said outlet being less than 2W, continuous inertance loop means connecting said control ports together, said continuous inertance loop being of a length and cross-sectional area such as to maintain the frequency of oscillation sufficiently low such that there is minimum mixing of defrost/defog air with ambient air.

30. The defrost/defog system defined in claim 29 wherein said power nozzle has converging sidewalls.

* * * * *